(12) United States Patent
Braeuer et al.

(10) Patent No.: US 10,400,898 B2
(45) Date of Patent: Sep. 3, 2019

(54) CONTROL VALVE

(71) Applicant: SAMSON AG, Frankfurt am Main (DE)

(72) Inventors: Anke Braeuer, Erlensee (DE); Joerg Kiesbauer, Eppertshausen (DE); Klaus Hoerschken, Villmar (DE)

(73) Assignee: SAMSON AG, Frankfurt am Main (DE)

( * ) Notice: Subject to any disclaimer, the term of this patent is extended or adjusted under 35 U.S.C. 154(b) by 0 days.

(21) Appl. No.: 15/418,638

(22) Filed: Jan. 27, 2017

(65) Prior Publication Data
US 2017/0219102 A1    Aug. 3, 2017

(30) Foreign Application Priority Data

Jan. 28, 2016 (DE) .......................... 10 2016 101 547

(51) Int. Cl.
*F16K 1/52* (2006.01)
*F16K 1/12* (2006.01)
(Continued)

(52) U.S. Cl.
CPC .................. *F16K 1/52* (2013.01); *F16K 1/12* (2013.01); *F16K 1/46* (2013.01); *F16K 1/54* (2013.01); *F16K 3/267* (2013.01); *F16K 47/04* (2013.01)

(58) Field of Classification Search
CPC ..... Y10T 137/86734; Y10T 137/86799; Y10T 137/86807; Y10T 137/86759;
(Continued)

(56) References Cited

U.S. PATENT DOCUMENTS 1,919,856 A    7/1933  McGeorge
3,230,973 A    1/1966  Schork et al.
(Continued)

FOREIGN PATENT DOCUMENTS

CH    706952    3/2014
FR    2303213   10/1976
(Continued)

OTHER PUBLICATIONS

European Patent Office, European Search Report, dated May 29, 2017, p. 1-9, Application No. 17153611.3, Applicant: Samson Aktiengesellschaft.
(Continued)

*Primary Examiner* — Michael R Reid
(74) *Attorney, Agent, or Firm* — Woodling, Krost and Rust

(57) ABSTRACT

The invention relates to a process for a control valve having a valve seat and a throttle element, which throttle element has a sealing edge for sealing the valve seat, and furthermore a first opening area and a second opening area, which throttle element can furthermore be positioned relative to the valve seat by a positioning motion such that the first opening area will be effective in a first opening position thereof and/or the second opening area will be effective in a second opening position thereof, characterized in that a sealing element is arranged on the throttle element and/or the valve seat such that the throttle element will pass over a sealing position as it transitions from the first opening position to the second opening position, in which sealing position the first opening area will be effective and the second opening range will not be effective.

9 Claims, 3 Drawing Sheets

Figure 1:
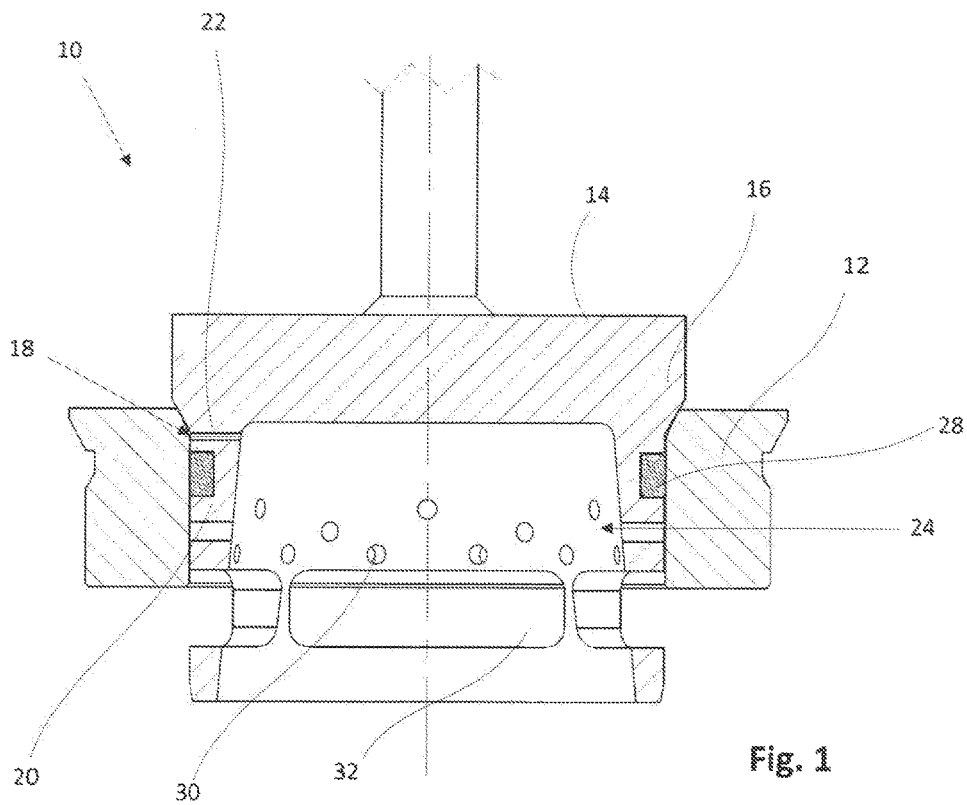

(51) Int. Cl.
*F16K 1/46* (2006.01)
*F16K 47/04* (2006.01)
*F16K 1/54* (2006.01)
*F16K 3/26* (2006.01)

(58) Field of Classification Search
CPC . Y10T 137/86791; F16K 47/04; F16K 47/08; F16K 1/46; F16K 1/52; F16K 1/54; F16K 3/267; F16K 1/12; F16K 3/262; F16K 3/26; F16K 3/243; F16K 3/246
USPC .............. 137/625.38, 625.39, 625.3, 625.33, 137/625.37; 251/206, 210, 325, 205, 207
See application file for complete search history.

(56) References Cited

U.S. PATENT DOCUMENTS

| | | | |
|---|---|---|---|
| 4,261,389 A | | 4/1981 | Hager et al. |
| 4,311,170 A | * | 1/1982 | Dolan ................. F16K 1/38 137/614.17 |
| 4,375,821 A | * | 3/1983 | Nanao ................. F16K 3/26 137/239 |
| 4,638,833 A | | 1/1987 | Wolcott, II |
| 5,544,855 A | | 8/1996 | Henken et al. |
| 5,964,248 A | | 10/1999 | Enarson et al. |
| 6,973,941 B2 | * | 12/2005 | Baumann ................. F16K 3/267 137/625.37 |
| 2015/0041697 A1 | * | 2/2015 | Hermann ................. F16K 1/38 251/264 |
| 2015/0252906 A1 | | 9/2015 | Glime, III |
| 2016/0258539 A1 | | 9/2016 | Langenegger |

FOREIGN PATENT DOCUMENTS

| | | |
|---|---|---|
| GB | 333429 | 8/1930 |
| JP | S576164 | 1/1982 |
| WO | 9703313 | 1/1997 |

OTHER PUBLICATIONS

German Patent and Trademark Office, Translation of the Examination dated Oct. 13, 2016, pp. 1-4, Application No. 102016101547.4.
German Patent and Trademark Office, Examination Report, dated Oct. 13, 2016, pp. 1-6, Application No. 102016101547.4.

* cited by examiner

CONTROL VALVE

German patent application serial no. 10 2016 101 547.4, filed Jan. 28, 2016 is incorporated herein in its entirety by reference hereto. Priority is claimed to German patent application serial no. 10 2016 101 547.4, filed Jan. 28, 2016.

The invention relates to a control valve.

Control valves of the generic kind comprise a valve seat and a throttle element. The throttle element is designed such that over the valve travel there is a change in the difference in cross-sectional area between the valve seat and the throttle element, which is used to provide flow control.

DE 43 31 417 A1 discloses a control valve of this type, in which the change in cross-sectional area is obtained by means of a recess provided in a substantially sealing projection. Contrary to a completely circumferential constriction, this results in more precise flow control for low flow rates.

DE 695 17 363 T2 discloses a control valve that is embodied as a cage valve, where the cage is operating with a valve seat, having a sealing region. According to this a two stage flow control is possible.

Nevertheless, some imprecision remains owing to the tolerances between the valve seat and the throttle element.

It is the object of the invention to achieve more precise flow control of small flow rates so as to ensure a high regulation ratio, which is the ratio of the nominal flow to the smallest controllable flow.

In a known manner, a control valve comprises a valve seat and a throttle element, with the throttle element including a sealing edge for sealing the valve seat. Furthermore, the throttle element has a first opening area and a second opening area. Moreover, a positioning motion can be used to position the throttle element relative to the valve seat in such a manner that the first opening area will be effective in a first opening position and that the first and/or the second opening area will be effective in a second opening position.

According to the invention, it is envisaged for a sealing element to be provided on the throttle element so that the throttle element will pass over a sealing position as it transitions from its first to its second opening position. In this sealing position, the first opening area will be effective and the second opening area will not be effective.

In this way, precise control can be accomplished in the first opening area, since the tolerance influences will be reduced in view of the sealing towards the second opening area. This allows the first opening area to be operated with high precision and thus in an adjustable manner even for small flow rates. As a consequence, a high regulation ratio can be achieved.

According to a further aspect of the invention, the sealing element is provided on the throttle element and/or on the valve seat so that the throttle element will pass over a sealing position as it transitions from its first to its second opening position. In this sealing position, the first opening area will be effective and the second opening area will not be effective. The sealing element in its axial extension has the same or a smaller extension than the distance that lies between the first opening area and the second opening area. Due to the relatively small axial extension of the sealing element there is a reduced friction.

Preferably, the sealing position is defined by a sealing element which is positioned between the first and second opening areas on the throttle element and which cooperates with the valve seat. In particular, a circumferential seal, which is in particular pre-stressed, seals on a corresponding sealing surface.

According to the position of the sealing element between the first and the second opening area on the throttle element a precise flow control can be achieved. Furthermore a high life-expectancy of the sealing element can be achieved.

The sealing position may also be constituted by a sealing element which is arranged on the valve seat. The sealing element cooperates with a sealing surface on the throttle element, which surface is between the first and second opening areas.

In a particularly advantageous embodiment, the throttle element comprises a hollow body having a wall which has openings in the first opening area. The openings in the first opening area in particular have an opening surface of less than 5% of the valve seat surface.

As the sealing element is positioned between the first and the second opening area on the throttle element, where each opening area comprises at least one opening in the wall, the sealing element is not burdened by the fact that the sealing element is passed by the throttle element comprising the openings. The sealing element rather is in contact with the smooth surface of the valve seat and can be moved relative to it without great abrasion.

By designing the throttle element as a hollow body, a circumferential seal can be provided which has extremely low leakage in its sealing position, yet allows precise flow through the openings. The openings are made in the wall of the hollow body, in particular in the form of bores. Owing to this design, the flow rate will not be affected by the tolerance between the valve seat and the throttle element, but is exclusively based on the diameter of the openings in the wall.

Furthermore, the throttle element can also be designed as a second opening area by a hollow body which comprises a wall with openings. The openings may be bores and/or large recesses such as windows. The second opening area may constitute the main opening.

In yet another preferred embodiment, the throttle element may consist of multiple parts, with the first and second opening areas being formed from different components. This is a simple way of providing the sealing area between the opening area and the closing area.

Preferably, the sealing element can be a sealing ring, in particular including graphite, elastomers, metal, PTFE, or a mix of the aforementioned materials.

The valve seat may comprise a seat edge, which is cooperating with a sealing edge of the throttle element in a closed position, where the valve seat also comprises a throttle region within which the throttle element can move axially.

From the seat edge to the throttle region of the valve seat, the surface of the valve seat is sloped where it transitions from the sloped region to the throttle region.

This has the advantage that in case the throttle element, comprising the sealing element is an operating position where the sealing element is fully outside the valve seat, it can resume a position within the throttle region of the valve seat with reduced abrasion of the sealing element.

Additional advantages, features and possible applications of the present invention can be gathered from the description which follows, in which reference is made to the embodiments illustrated in the drawings.

Figure 2:
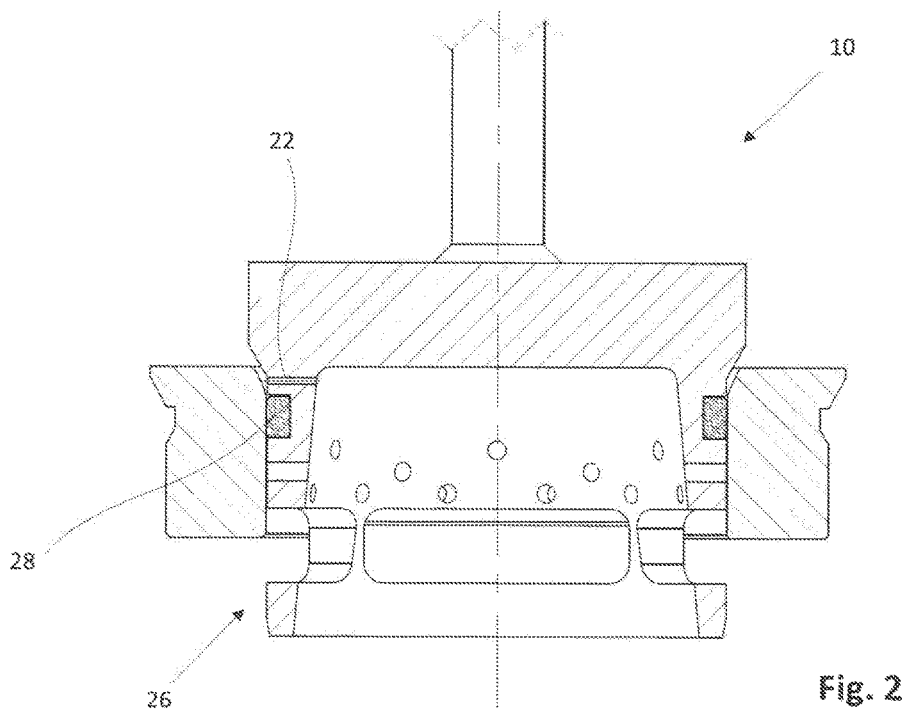
Figure 3:
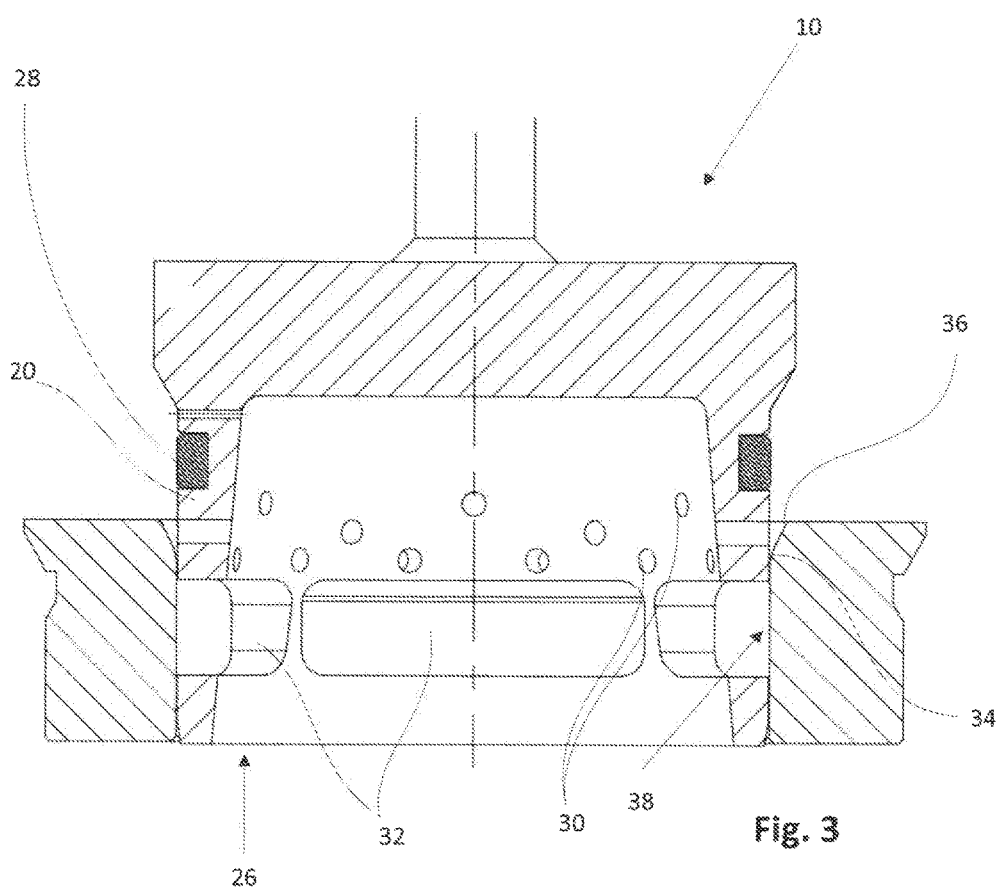
Figure 4:
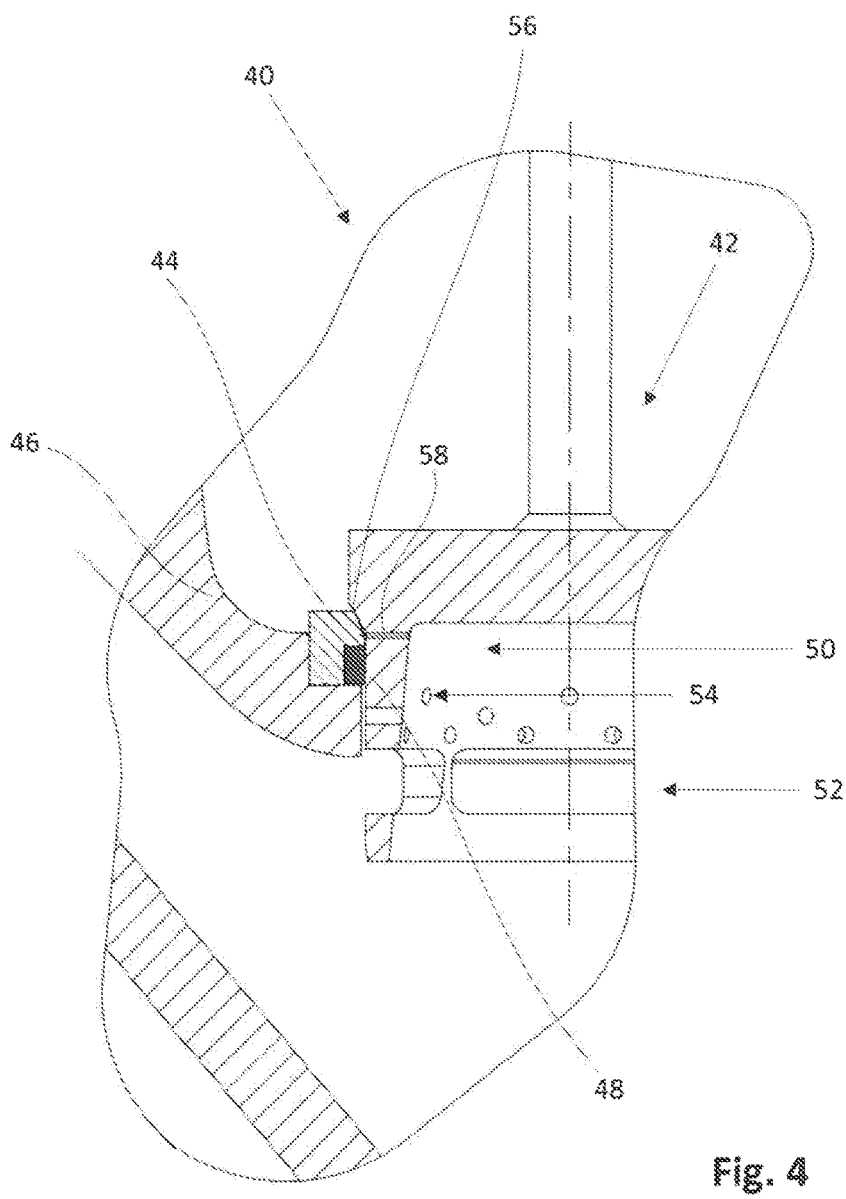

Throughout the description, the claims and the drawings, those terms and associated reference signs are used as are indicated in the list of reference signs which follows below. In the drawings, FIG. 1 is a schematic sectional view of parts of a control valve according to the invention in a closed state thereof;

FIG. 2 is a schematic sectional view of a control valve according to the invention as shown in FIG. 1 in a first opening position thereof, FIG. 3 is a schematic sectional view of a control valve according to the invention as shown in FIG. 1 in a second opening position thereof, and FIG. 4 is a schematic sectional view of parts of another embodiment of a control valve according to the invention.

FIG. 1 is a schematic sectional view of parts of a control valve 10 according to the invention, which valve 10 comprises a valve seat 12 and a throttle element 14. The view shows the control valve 10 in a closed position, in which the valve seat 12 and the throttle element 14 abut on each other on a sealing edge 16. The basic body of the throttle element 14 is in the form of a hollow body and has a bore 22 in a first opening area 18 thereof, which bore 22 extends through the wall 20 of the hollow body. Further openings 24 which may consist of bores 30 and window apertures 32, are made into the wall 20 in a second opening area 26.

Between the first opening area 18 and the second opening area 26, a sealing ring 28 is accommodated in a groove made in the wall. The sealing ring 28 cooperates with the wall of the valve seat to seal the second opening area 26.

FIG. 2 is a schematic sectional view of parts of a control valve 10 according to the invention, in a first opening position thereof. In this first opening position, the at least one bore 22 allows the passage of a small but precise flow of the fluid to be controlled. The sealing ring 28, which is in its sealing position in the first opening position, prevents passage of the fluid through the second opening area 26.

FIG. 3 is a schematic sectional view of parts of a control valve 10 of the present invention, in a second opening position thereof. In this state, the sealing ring 28 is not in a sealing position, and the fluid flow occurs via the second opening area 26, amongst others. In the second opening area 26, a multitude of bores 30 may be provided in the wall 20 which allow passage of the fluid in the second opening position. Moreover, openings may also be provided which allow a through-flow that is substantially unthrottled and which are referred to as windows 32 here. Furthermore there is a transition 34 from a sloped region of the valve seat to the throttle region 38 of the valve seat, where the sloped region extends from the seat edge 36 to the throttle region 38. According to this the sealing ring 28 can be brought form a position shown in FIG. 3 to an operating position shown in FIG. 2 in a gentle way.

In the second opening position, a much larger volume flow—compared to the volume flow in the first opening position—can pass through the valve seat. Consequently, an exceptionally high regulation ratio can be achieved with a valve according to the present invention.

FIG. 4 is a partial schematic sectional view of parts of another embodiment of a control valve 40 according to the invention. The throttle body 42 cooperates with a valve seat 44 which is incorporated in the valve housing 46. The valve seat 44 is provided with a circumferential sealing ring 48.

Furthermore, the control element, similar to the embodiment illustrated in FIGS. 1 to 3, has a first opening area 50 and a second opening area 52. Situated between the first opening area 50 and the second opening area 52 is a closed wall surface 54 which, in a sealing position thereof, cooperates with the sealing ring 48. In the closed state of the valve, the first opening area 50 is between the sealing edge 56 of the valve seat and the sealing ring 48. As the valve increasingly opens towards the first opening position, the control element moves along the axial extension of the sealing ring 48 in a sealing position, until the second opening area passes over the sealing ring 48, and leaves the sealing position. From this position onwards, the second opening range 52 can be used to adjust a flow which increases up to the nominal flow.

LIST OF REFERENCE SIGNS 10 control valve
12 valve seat
14 throttle element
16 sealing edge
18 first opening area
20 wall
22 bore
24 openings
26 second opening area
28 sealing ring
30 bore
32 window
34 transition
36 seat edge
38 throttle region
40 control valve
42 throttle element
44 valve seat
46 valve housing
48 sealing ring
50 first opening area
52 second opening area
54 wall
56 sealing edge
58 openings

What is claimed is:

1. A control valve (10, 40), comprising:
a valve seat (12, 44) and a throttle element (14, 42);
said throttle element includes a hollow portion:
said throttle element (14, 42) includes a sealing edge (16, 56) for sealing said valve seat (12, 44);
said throttle element has a first opening area (18, 50) and a second opening area (26, 52);
said throttle element has a recess therein between said first opening area (18, 50) and said second opening area (26, 52);
a sealing element (28, 48), said sealing element resides in said recess of said throttle element (14, 42) between said first opening area (18, 50) and said second opening area (26, 52), said sealing element cooperates with said valve seat (12, 44);
when said throttle element is in the closed position said sealing element (28, 48) is in a closed position and engages said valve seat, and said first opening area (18, 50) and said second opening area (26, 52) do not permit communication of fluid between said throttle element and said valve seat;
when said throttle element (14, 42) is positioned in a first opening position relative to said valve seat (12, 44) said sealing element (28, 48) is in a first opening position and engages said valve seat, and said first opening area (18, 50) permits communication of fluid between said throttle element and said valve seat but said sealing element does not permit communication of fluid between said throttle element and said valve seat in said second opening area (26, 32); and,
when said throttle element (14, 42) is positioned in a second opening position relative to said valve seat (12, 44) said sealing element (28, 48) is in a second opening position and does not engage said valve seat, and said first opening area (18, 50) and said second opening area (26, 32) permit communication of fluid between said hollow portion of said throttle element and said valve seat.

2. The control valve (10, 40) as claimed in claim 1, further comprising:
said sealing element includes an axial extension the length of said recess in said hollow throttle element.

3. The control valve (10, 40) as claimed in claim 1, further comprising:
said hollow portion of said throttle element (14, 42) comprises a hollow body, said hollow body includes a wall (20, 54), said wall has at least one precision bore (22, 58) in said first opening area (18, 50) for precise control of low fluid flow rates;
said valve seat has a surface area; and,
said at least one precision bore (22, 58) has an opening area of less than 5% of the valve seat surface area.

4. The control valve as claimed in claim 1, further comprising:
said hollow portion of said throttle element (14, 42) comprises a hollow body, said hollow body includes a wall (20, 54), said wall (20) has at least one opening (24) in said second opening area (26, 52).

5. The control valve as claimed in claim 1, further comprising:
said sealing element is a sealing ring (28, 48).

6. The control valve as claimed in claim 1, further comprising:
said sealing element includes graphite and/or elastomer and/or metal and/or PTFE.

7. The control valve as claimed in claim 1, further comprising:
said first opening area (18, 50) and said second opening area (26, 52) of said throttle element are formed from different parts.

8. The control valve as claimed in claim 1, further comprising:
said valve seat comprises a seat edge (36) and a throttle region (38); and,
a sloped transition from said seat edge (36) to said throttle region (38).

9. The control valve (10, 40) as claimed in claim 1, further comprising:
said first opening area is a precision bore in said throttle element residing adjacent said sealing edge of said throttle element.

* * * * *